Dec. 27, 1927.
W. F. GERHARDT
1,653,700
TRUE AIRSPEED INDICATOR
Filed June 27, 1923
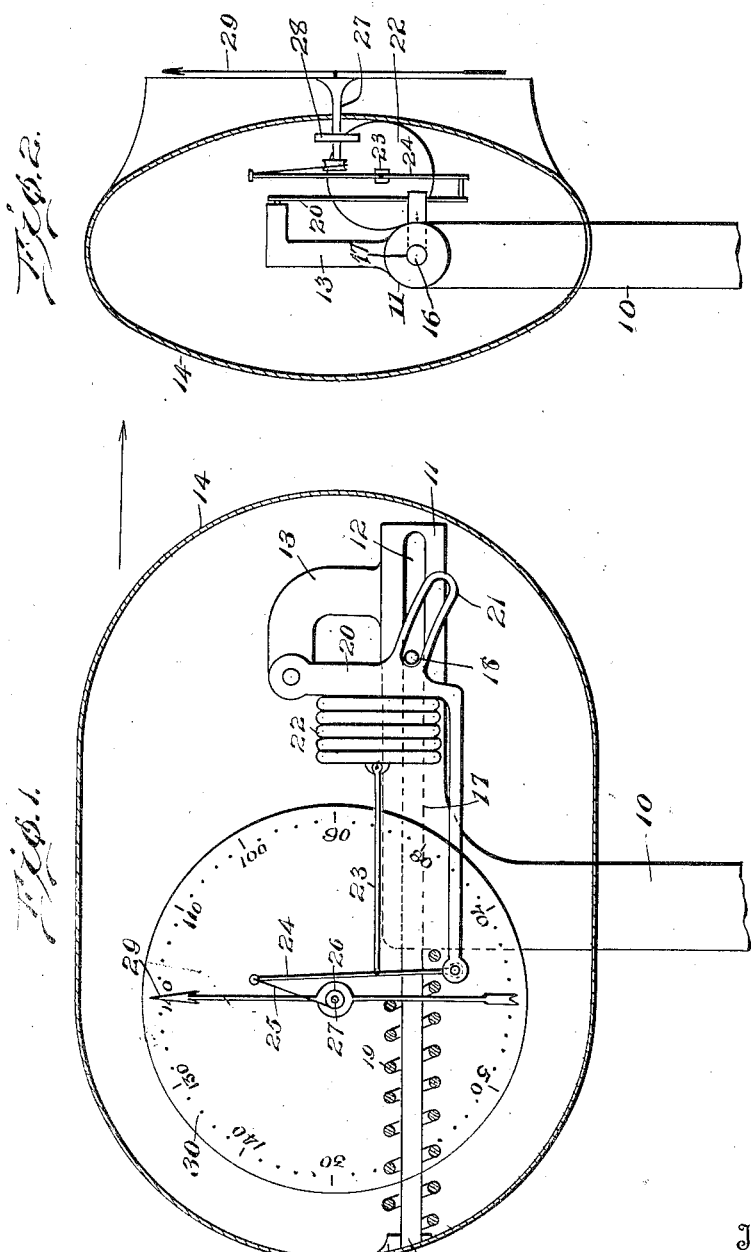
Inventor
W. F. Gerhardt
By Robert H. Young
Attorney Patented Dec. 27, 1927.

1,653,700

UNITED STATES PATENT OFFICE.

WILLIAM FREDERICK GERHARDT, OF DAYTON, OHIO.

TRUE-AIR-SPEED INDICATOR.

Application filed June 27, 1923. Serial No. 648,048.

This invention relates to anemometers and more particularly to that type especially adapted for use on aircraft.

The object of this invention resides in the provision of a device as above set forth in which the indicating needle thereof is moved relative to an evenly divided dial only in proportion to the change of speed of the aircraft.

More specifically this invention contemplates an instrument including a deflectible casing or shell adapted to be placed in the free air stream and deflected by its air resistance against the pressure of a spring. The motion caused by the deflection is transmitted through a cam and sylphon controlled lever so that the deflection proportional to the dynamic pressure is made proportional to the true air velocity, and this motion indicated by a rotatably mounted needle on a dial having uniform graduations gives an indication of the true airspeed.

A further object of this invention is to provide an airspeed indicator which will indicate true airspeed irrespective of altitude in that the instrument automatically compensates for the variations of air density.

With these and other objects in view this invention consists of certain novel combinations and arrangements of parts as will be hereinafter described and claimed.

In the drawings wherein like parts are designated by like characters in the several views, Fig. 1 is a front elevation with the casing in section, and Fig. 2 is an end elevation with the casing in section.

Referring to the parts by reference characters 10 designates a supporting standard having an arm 11 extending therefrom, the latter being provided with a guideway 12 for a purpose to be hereinafter set forth. A second extension 13 is provided on the arm 11. A movable or deflectible shell or casing 14 is carried by the standard 10 and has secured at 15 a plunger rod 16 having a portion thereof slidable in the bore 17 in the arm 11 of the standard 10 and the end opposite to its connection with the casing is provided with an angularly disposed pin 18 slidable in the guideway 12 in the arm 11. A coil spring 19 is wound about a portion of the plunger rod 16 and has one end thereof in engagement with the standard 10 and the opposite end placed against the inner face of the casing 14 to resist movement of the casing in the direction of the arrow in Fig. 1, relative to the standard 10. The casing 14, it will be observed, has a regular contour, devoid of sudden bends that might produce eddy currents; it is substantially stream line shaped. This gives it uniform air resistance characteristics which are highly desirable in this instrument, especially in rendering it possible to make the computation of the scale hereinafter referred to, based on a single constant, one that is effective at all airspeeds within the range of the instrument. The scale referred to may for this reason have uniform divisions if other conditions hereinafter mentioned are also made. Pivotally mounted on the extension 13 is a bell crank lever 20 having a camway 21 formed in a portion thereof adapted to receive the pin 18 so that movement of the plunger rod 16 is imparted to the bell crank lever.

A sylphon 22 is provided on the lever 20 having a link 23 pivotally connected therewith. A lever 24, which is pivotally connected with the bell crank lever 20, is fulcrumed on this link 23 so that the position of the lever 24 is governed by the position of the bell crank lever 20, and also by the expansion and contraction of the sylphon 22. In other words, the sylphon action changes the effective length of the lever 20 to correct for different air densities. A chain or cord 25 is connected to the free end of the lever 24 and is wound about a drum 26 which is mounted on a needle carrying shaft 27, rotary movement of which in one direction is urged by the spring 28. The rotation of the shaft is controlled by the movement of the cord 25. Fixedly on the shaft 27 is the indicating needle 29 adapted to rotate adjacent a uniformly graduationed dial 30.

As the instrument moves through the air the air resistance or impingement forces the casing 14 in the direction of the arrow in Fig. 1 against the tension of the spring 19. Movement is obviously given the plunger rod 16 and thus the pin 18 is moved in the camway 21 and the bell crank lever 20 is rocked on its pivotal connection on the extension 13 to move the lever 24 on its fulcrum connection with the link 23. The free end of the lever 24 consequently approaches the axis of the needle 29 so as to shorten the cord 25 and allow the spring 28 to rotate the shaft 27 and thus the needle 29 an amount proportional to the movement of the end of the bell crank lever 20 to which the lever 24 is connected. On account of the shape of the camway a uniform scale, such as that shown at 30, can be used. The movement of the casing 14 against the tension of spring 19, proportional to $q=Kdv^2$, is made proportional to $$\sqrt{q} = \sqrt{dv^2},$$

where $q$ is the dynamic pressure, $d$ the air density, $v$ the true air velocity and $k$ a constant, the value of which is determined by the special shape and size of the casing. If the casing is of a proper shape so as to be substantially streamlined and devoid of abrupt changes in curvature, the same constant applies throughout the range of air speeds of the instrument, thus permitting the use of a uniformly divided scale. The change of air density due to variation of altitude is taken care of in such a manner by the expansion of the sylphon 22 whereby the fulcrum point of the lever 24 is moved to vary the effective length of the lever 20 so that a proportional restricted movement of the bell crank lever 20 will impart the necessary amount of movement to the lever 24, whereby the needle will be allowed to rotate the correct distance.

Having thus described my invention, I do not wish to limit myself to the exact construction shown and described, but to cover all such combinations and arrangements as properly come within the scope of the appended claims.

I claim:

1. An air speed indicator comprising a support, a bodily movable casing mounted upon said support, means yieldingly restraining the movement of said casing on said support, mechanism inclosed by said casing and having connection therewith and with the support so as to be operated by the movement of the casing, and indicating means controlled by said mechanism.

2. An airspeed indicator comprising a casing subject to movement by free air impingement, a guide member movable with said casing, a fixed guide for said guide member, mechanism in said casing operatable by the movement of the casing relative to the guide and including yieldable means interposed between said casing and guide, a lever pivoted upon said guide and having connection with said guide member so as to be rocked by movements of said casing, and indicating means mounted adjacent said lever to be moved by the movement of said lever.

3. An airspeed indicator comprising a casing subject to movement by free air impingement, a guide member movable with said casing, a fixed guide for said guide member, mechanism in said casing operatable by the movement of the casing relative to the guide and including yieldable means interposed between said casing and guide, a lever pivoted upon said guide and having connection with said guide member so as to be rocked by movements of said casing, indicating means, means connecting said indicating means to said lever for operation thereby and compensating means responsive to changes in air pressure to compensate the motion imparted to the indicating means by said lever.

4. An air speed indicator comprising a support, a casing mounted for bodily movement by free air impingement thereon relative to said support, means operable by the movement of the casing, including a plunger rod fast to said casing, guide means for said plunger rod on said support, a bell crank lever comprising a plurality of lever arms pivoted on said guide means and operated by the movement of said plunger rod, a second lever pivoted to said bell crank lever, a closed bellows attached at one end to said bell crank lever, having its opposite end connected to said second lever to compensate for air density, and an indicator operated by said second lever to indicate true air speed.

5. An air speed indicator as set forth in claim 4, said bell crank lever being connected with said plunger rod by means of a cam slot in one of said lever arms.

6. A true air speed indicator comprising a casing mounted to move bodily by air impingement and having a regular rounded contour devoid of abrupt changes in form to avoid eddy currents, mechanism within said casing operated by bodily movements thereof, compensating means mounted on said mechanism for movement relative thereto to compensate for air density, and indicating means operated by said mechanism and calibrated by the movement of said compensating means to express the movement of said casing in terms of air speed.

7. An anemometer device for aircraft comprising an air impingement member, a scale calibrated in airspeed, and means indicating on said scale the movement of said member, said member being of regular substantially stream lined shape devoid of sharp bends and curves to avoid eddy currents and being fully exposed to the air rush so that said scale may be uniform within the range of the instrument.

8. An anemometer for aircraft comprising an air impingement member to be placed in the free air stream, means normally restraining the member from movement, an airspeed scale having substantially uniform divisions, means for indicating on said scale the movement of said member, and means operably connected to said indicating means to correct for changes in air density.

9. An anemometer for aircraft, comprising an air impingement member disposed in the free air stream, said member being of a regular form devoid of abrupt changes in contour to avoid eddy currents, means normally restraining said member from movement, an airspeed scale having substantially uniform divisions, means for indicating on said scale the movement of said member, and means operably connected to said indicating means to correct for changes in air density.

10. An anemometer for aircraft comprising an air impingement member to be placed in the free air stream, means normally restraining the member from movement, an airspeed scale having substantially uniform divisions, means for indicating on said scale the movement of said member, and means operably connected to said indicating means to correct for changes in air density, said correcting means comprising a sylphon adapted to contract and expand due to changes in air density.

11. A true airspeed indicator comprising a standard, a casing mounted for movement on said standard by air impingement, means yieldingly restraining said casing from movement, a true airspeed scale, a pointer operating relative thereto, a first lever connected to said pointer to move the same, a second lever attached to said first lever pivoted on said standard, and means connecting with said casing to rock said second lever in the movement of the casing, a link connected with said first lever, and a sylphon connected between said link and said second lever, said sylphon contracting and expanding for changes in air density and correcting the relation of said first lever to said second lever to correct the position of said pointer with reference to said scale.

12. An anemometer device of the kind described comprising a standard, a casing mounted to move with reference thereto by air impingement, a yielding means interposed between said casing and said standard normally restraining said casing from movement, a member fixed to said casing moved with reference to said standard in the movement of said casing, a scale carried by said casing, a pointer moving with reference to said scale, and means connected between said standard and said first mentioned member to operate said pointer in the movement of said casing.

13. An anemometer device of the kind described comprising a standard, a casing mounted to move with reference thereto by air impingement, a yielding means interposed between said casing and said standard normally restraining said casing from movement, a member fixed to said casing moved with reference to said standard in the movement of said casing, a scale carried by said casing, a pointer moving with reference to said scale, and means connecting said first mentioned member to said pointer to operate the latter in the movement of said casing, said means including a lever rocked in the movement of said casing having a camway wherein a pin mounted on said first mentioned member is arranged to operate, the form of said camway being such that uniform movement is communicated to said pointer in proportional increases of airspeed.

14. An anemometer device of the kind described comprising a standard, a casing mounted to move with reference thereto by air impingement, a spring means interposed between said casing and said standard normally restraining said casing from movement, a member fixed to said casing moved with reference to said standard in the movement of said casing, a scale carried by said casing, a pointer moving with reference to said scale, means connecting said first mentioned member to said pointer to operate the latter in the movement of said casing comprising a lever rocked in the movement of said casing having a camway wherein a pin mounted on said first mentioned member is arranged to operate, the form of said camway being such that uniform movement is communicated to said pointer in proportional increases of airspeed, and a sylphon connected between said lever and said pointer to correct the movement communicated to the latter by the former for changes in air density.

In testimony whereof I affix my signature.

WILLIAM FREDERICK GERHARDT.